Patented Dec. 11, 1928.

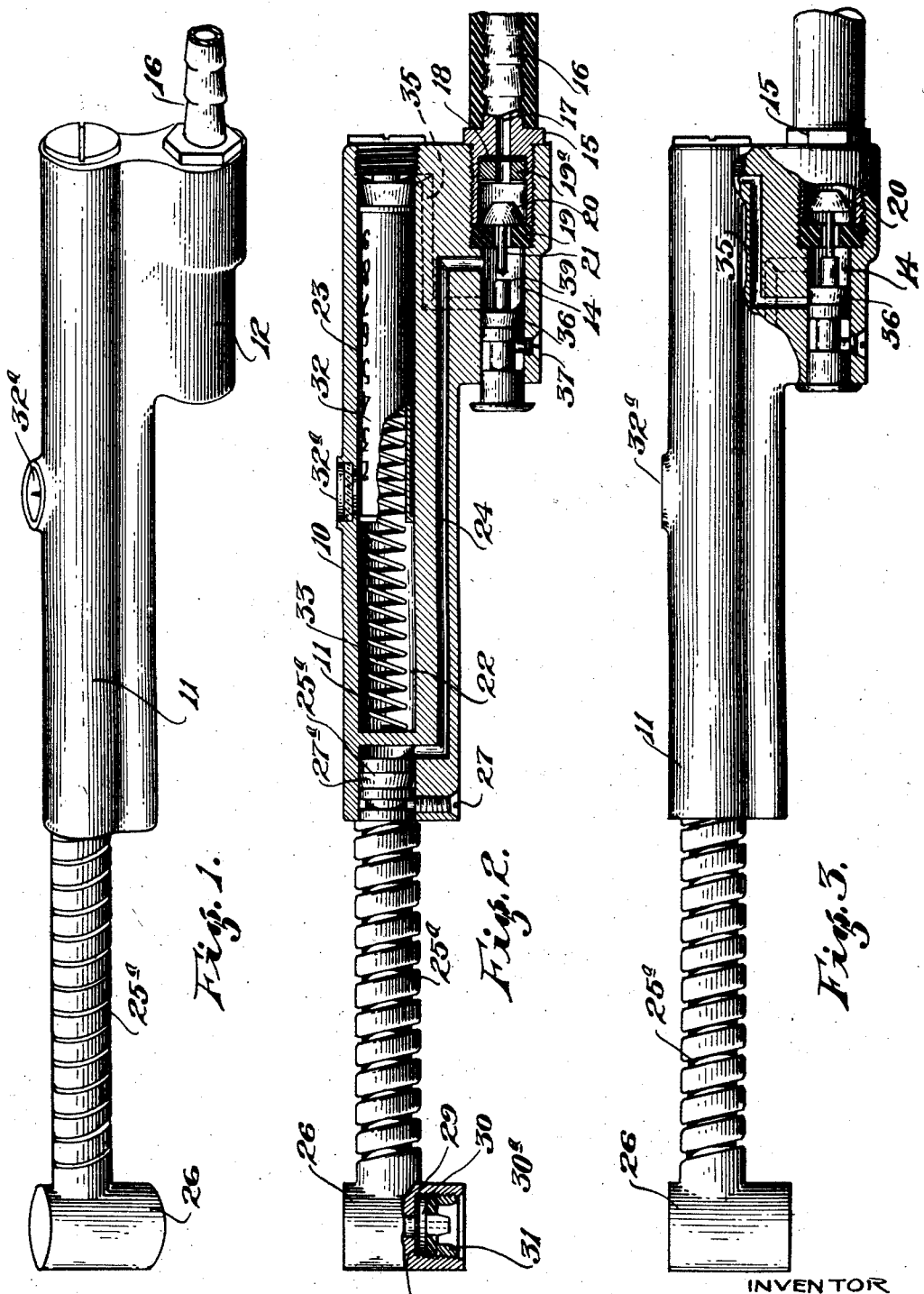

1,695,018

UNITED STATES PATENT OFFICE.

AMOS S. MARCHUS, OF OAKLAND, CALIFORNIA.

COMBINATION AIR NOZZLE AND GAUGE.

Application filed October 1, 1924. Serial No. 740,954.

This invention relates to appliances for use in connection with air delivery hoses at automobile service stations, for the purpose of inflating and testing pneumatic tires. It is the principal object of the present invention to provide an improved device of the character referred to, which may be connected with the discharge end of an air delivery hose in lieu of the usual air cock, and which is capable of transmitting air to a tire from the hose and automatically indicating the pressure in the tire when desired, whereby to facilitate the inflation and testing of pneumatic tires.

In carrying out this object, I provide a device which may be connected with an air hose, and which is equipped with a fitting by which it may be operatively connected with a tire valve. The device also embodies a pressure gauge which communicates indirectly with the fitting mentioned. To control the passage of air through the device to the tire and from the tire to the gauge I provide a simple valve mechanism which operates to alternately place the tire valve fitting in communication with the air hose and the pressure gauge.

One form which the invention may assume is exemplified in the following description and illustrated by way of example in the accompanying drawings, in which:

Fig. 1 is a perspective view of a device embodying the preferred form of the invention.

Fig. 2 is a central longitudinal section through the device showing the parts in normal position.

Fig. 3 is a longitudinal section of the device taken slightly off the center and showing the valves in a position establishing communication between the air hose and the tire valve stem fitting.

Referring more particularly to the accompanying drawings, 10 indicates a casing composed of an elongated main barrel 11 and a comparatively short auxiliary barrel 12. The barrels 11 and 12 are in the present instance integrally formed and disposed side by side in axial alignment with the auxiliary barrel disposed at one end of the main barrel.

The auxiliary barrel is formed with a central bore 14, one end of which is counterbored and threaded for the reception of the threaded shank of an air hose coupling 15. The coupling is formed with a serrated shank 16 for insertion into the end of a hose. A central passageway 17 is formed through the hose coupling 15, in which passageway a screen 18 is interposed. This screen is attached to an exteriorly threaded member 19ᵃ which threads into a threaded counterbore at the inner end of the hose coupling.

Due to the counterboring of the auxiliary barrel 12, a shoulder is formed intermediate the ends of this barrel. A valve seat member 19 is pressed into the counterbore and abutted against this shoulder. This valve seat 19 is preferably but not necessarily formed of rubber or other resilient material. A check valve 20 is provided to seat against this seat. The valve 20 is formed with a stem 21 which extends through the bore of the seat member so that the valve, which is normally maintained closed by the air pressure entering the counterbore in the auxiliary barrel, will cooperate with the seat. From Fig. 2 it is seen that the valve member 21 controls the passage of air from the hose coupling to the portion of the central bore 14 beyond the valve seat, and when closed impounds the air in the counterbore of the auxiliary barrel.

The main barrel 11 of the body member is bored inwardly from each end to form a discharge chamber 22 and a gauge chamber 23 which are separated by an imperforate wall and are not in direct communication with each other. The former communicates with the central bore 14 in the auxiliary barrel 12 through the medium of a passageway 24. It is seen that due to the pressure of air entering the auxiliary barrel from the hose, the check valve 20 is normally closed and prevents air entering the auxiliary barrel through the hose coupling from entering the passageway 24 and discharging through the discharge chamber 22 in the main barrel 11.

The discharge chamber 22 turnably receives a bored plunger fixed at the end of a length of flexible tubing 25, the other end of which is fitted with a tire valve fitting 26. The plunger 25ᵃ is circumferentially grooved to receive the end of a locking screw 27, which is threaded transversely through the wall of the barrel. This locking screw 27 permits the tube 25 to rotate, but prevents its removal from the main barrel. Leakage from the discharge chamber around the plunger 25ᵃ is prevented by a cup leather 27ᵃ fitted on the plunger. This packing is sufficiently tight to prevent leakage from the main barrel. The air, therefore, in order to escape must pass through the tubing 25 to the tire valve fitting 26.

Reference being had to Fig. 2 it is seen that the tire valve fitting is formed with an interior annular shoulder 28 for supporting a screen 29 and a tire valve engaging member 30 which is formed with an axially extending projection 30ª, which is adapted to engage and open the tire valve when the fitting 26 is placed on the tire valve stem. The member 26 and the screen are held in place in the fitting 26 by means of a ring 31 which threads into the mouth of the fitting 26. The interior diameter of this ring is sufficient to permit the insertion of a tire valve stem into the mouth of the fitting 26. Such insertion will cause the projection 30ª to engage the tire valve and depress the latter to open it. The member 30 is formed with a central orifice through which air may pass.

From Fig. 2 it is seen that a resilient packing washer is interposed between the ring 31 and the valve engaging member 30. This packing washer surrounds the projection on the valve engaging member so that when the tire valve stem is projected into the mouth of the fitting it may be pressed tightly against the packing washer to prevent leakage of the air. The projection 30ª on the valve engaging member will then extend into the valve casing and open the valve, thus establishing communication between the interior of the tire and the discharge chamber 22 in the main barrel.

The gauge chamber 23 snugly receives a reciprocable hollow cylindrical gauge plunger 32 which is suitably calibrated to indicate air pressure in pounds. These calibrations are visible from the exterior of the casing through an opening formed in the main barrel as at 32ª. In the opening 32ª a pointer is mounted so that the pressure will be accurately indicated. An expansion spring 33 is telescoped within the plunger and bears against the closed end thereof. The other end of this spring abuts against the inner end of the gauge chamber 23 so that the spring will constantly tend to maintain the plunger in extended position as shown in Fig. 2 and indicating zero in the opening 32ª. The closed end of the plunger 32 is fitted with a cup washer so that air under pressure admitted to the gauge chamber between the closed end of the plunger and the outer end of the chamber 23 will tend to compress the spring an amount corresponding with the pressure of the air. This pressure of the air will then be indicated by the pointer in the opening 32ª. To establish an operative connection between the discharge chamber and the plunger to indicate the pressure of air in the tire, a passageway 35 is formed in the casing 10 and extends between the bore 14 in the auxiliary barrel and the gauge chamber 23. It will be noticed in Fig. 3 that this passageway opens into the gauge chamber 23 at a point in close proximity to the end of the latter, so that the air will be admitted to the gauge chamber 23 between the end of the plunger and the outer end of the chamber. The other end of the passageway 35 opens into the bore 14 in the auxiliary barrel at a point forwardly of that at which the passageway 24 opens into the bore 14. This is so that the passageway 35 can be controlled by a plunger type valve 36, which is reciprocably mounted in the bore 14 in the auxiliary barrel. This valve 36 extends into the forward end of the auxiliary barrel and is fitted at its outer end with a button, so that it may be operated by the fingers of the hand.

In order to limit the inward and outward movement of this plunger valve I have formed a circumferential recess therein into which the end of a locking screw 37 projects. This screw in threaded through the wall of the auxiliary barrel and extends into the recess so that the inward and outward movement of the valve will be limited by engagement of the screw with the ends of the recess.

It should be stated that the plunger valve 36 is for the purpose of interrupting communication between the passageway 35 and the discharge chamber. The plunger valve also serves the purpose of an operating means for opening the check valve 20 to establish communication between the hose and the discharge chamber 22 to supply air to a tire. For this purpose the plunger valve is formed with an extension 39 which is engageable with the end valve stem of the check valve 20. When the plunger valve is depressed or in its innermost position as shown in Fig. 3 the check valve 20 will be open. When the plunger valve 36 is released the pressure entering through the hose will force the check valve 20 closed and consequently through the medium of the valve stem will move the plunger valve 36 to its outermost position. It is seen that in its outermost or normal position the plunger valve 36 permits communication between the passageways 35 and 24 and thereby automatically place the discharge chamber into communication with the gauge chamber when the supply of air from the air coupling to the discharge chamber is cut off upon the release of the plunger valve 36 by the user. Therefore, pressure entering the discharge chamber 22 from the tire will then be transmitted to the gauge chamber 23 and tend to cause the gauge plunger 32 to compress the spring 33 an amount to indicate the pressure in the tire. When the plunger valve 36 is depressed or moved inwardly to open the valve member 20 to again establish communication between the hose and the discharge chamber, it interrupts the communication between the passageways 35 and 24 so that the air entering the bore 14 from the hose will not affect the gauge and the latter will be rendered ineffective.

In operation of the device, when it is desired to inflate a tire the valve opening fitting is fitted on the tire valve stem to open the tire valve. As previously described, the flexible tubing which carries the tire valve stem fitting is turnable in the end of the main barrel. This permits the user to turn the valve stem fitting in any direction to accommodate the position of the valve stem on the wheel of the vehicle, and makes it unnecessary for the user to twist the hose. After placing the fitting 26 on the tire stem the plunger valve 36 is moved inwardly to open the valve 20 to establish communication between the hose and the tire valve stem. To ascertain the pressure in the tire it is only necessary to release the plunger valve. The pressure entering from the air hose will then force the valve member 20 closed and move the plunger valve to its outermost position. This, as described, will establish communication between the passageways 35 and 24 and automatically place the tire into communication with the gauge chamber. The air under pressure from the tire will then pass through the discharge chamber 22, the passageway 24, thence through the passageway 35 into the gauge chamber. This pressure will move the gauge plunger a corresponding amount so that the pointer will indicate the amount of pressure in the tire at the opening 32ª.

Should it become necessary to adjust the tension of the spring 33 to correct any inaccuracies which may appear after the device has been in use a considerable period, it is only necessary to insert washers or like spacing elements between the end of the spring and the closed end of the plunger.

From the construction described it is apparent that the gauge mechanism will not easily become out of order and as it is entirely inclosed it will not be affected by the entrance of grit or other foreign matter into the gauge chamber. It is likewise apparent that the valve mechanisms are fully protected as they are inclosed in the auxiliary barrel.

From the foregoing it is obvious that by my present invention I have provided a device which greatly expedites the inflation and testing of tires, inasmuch as it simplifies the operation and minimizes the time necessary to inflate and test the tires.

While I have shown the preferred form of my invention, it will be understood that various changes might be made in the combination, construction and arrangement of parts by those skilled in the art, without departing from the invention as set forth in the appended claim.

Having thus described my invention, what I claim and desire to secure by Letters Patent is:

A device of the character described comprising a casing having an elongated bore with closed ends formed therein, said casing having a counterbore in one end in alignment with said bore, a tire valve fitting rotatably secured in said counterbore, an air connection adapted to be placed in communication with said counterbore, a graduated cylindrical plunger disposed in said elongated bore and having a closed end, a spring bearing against said plunger, a sight opening formed through the casing in alignment with said graduations on said plunger, said casing being formed with an air opening formed therein contiguous to one end of the bore between the end of the bore and the end of the plunger and adapted to be placed in communication with the air connection whereby air entering the bore will seek to move the plunger against the pressure of the spring and indicate the pressure at the sight opening by the calibrations on the plunger.

AMOS S. MARCHUS.